May 12, 1931.    P. J. WARAKSA    1,805,346
WINDSHIELD VISOR
Filed Oct. 28, 1927

Peter J. Waraksa
INVENTOR

BY Victor J. Evans
ATTORNEY

Patented May 12, 1931

1,805,346

UNITED STATES PATENT OFFICE

PETER J. WARAKSA, OF EL PASO, TEXAS

WINDSHIELD VISOR

Application filed October 28, 1927. Serial No. 229,459.

This invention relates to certain novel improvements in adjustable visors for windshields or the like.

The foremost object of my invention is to provide a visor which may be expeditiously adjusted from the interior of the car or the like on which it is mounted.

Another object, ancillary to the foregoing, is to provide such a device which will be simple and economical in construction and which may be easily manipulated.

Other objects will appear hereinafter.

The invention consists in the novel combination and arrangement of parts to be hereinafter described and claimed.

Figure 1:
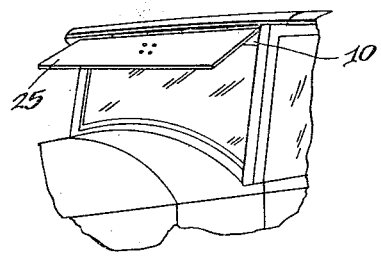
Figure 2:
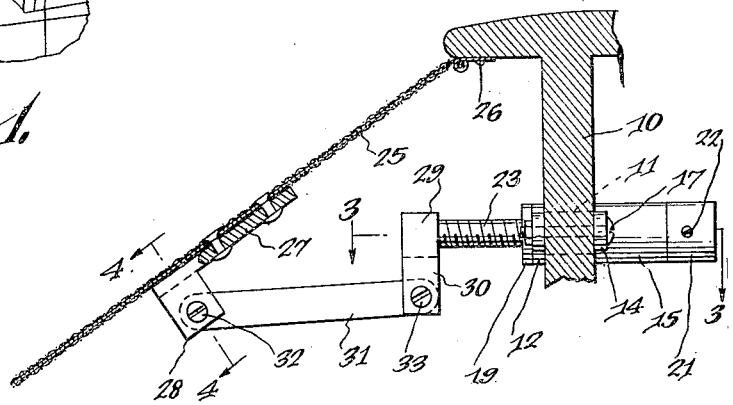
Figure 3:
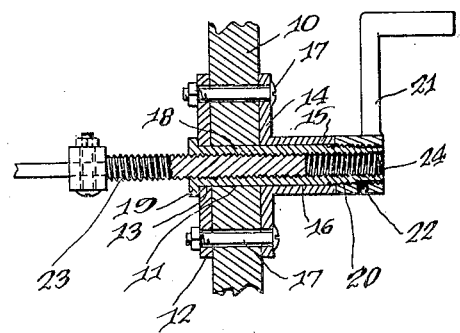

The invention will be best understood by reference to the accompanying drawings, showing the preferred form of construction and in which:

Fig. 1: is a perspective view of my improved visor in installed position;

Fig. 2: is a transverse sectional view of the visor taken substantially at the mid point of the longitudinal extent thereof;

Fig. 3: is a sectional view taken substantially on the line 3—3 on Fig. 2; and

Figure 4:
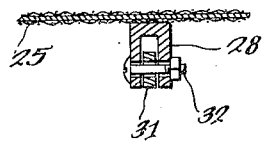

Fig. 4: is a sectional view taken substantially on the line 4—4 on Fig. 2.

In the drawings wherein a preferred embodiment of my invention is depicted, 10 indicates a conventional showing of the frame of an automobile. The section of the frame usually used is that above the windshield and an opening 11 is provided therein. The opening 11 is located such that the appurtenances to be mounted therein will not interfere with the normal functioning of the device.

A plate 12 is mounted on the outer side of the frame 10 and has an opening 13 therein adapted to be disposed in communication with opening 11. A plate 14 is disposed on the inner side of frame and this plate has a sleeve 15 formed integral therewith, the opening 16 in which is disposed in communication with opening 11. Bolt and nut structures 17 extend through plates 12 and 14 and frame 10 and serve to hold the plates in position.

A sleeve 18 extends through openings 13, 11, and 16. A shoulder 19 is provided at one end of sleeve 18 which abuts plate 14 and the opposite end of sleeve 18 extends beyond sleeve 15 and the periphery thereof is screw threaded as at 20. The handle 21 is fitted on the screw threads 20 and thus sleeve 18 is held in position, a set screw 22 serving to secure this part.

The interior of sleeve 18 is screw threaded and the screw 23 is arranged therein. A plug 24 is fitted at the inner end of sleeve 23. When handle 21 is turned, sleeve 18 is rotated, and thus screw 23 is moved in or out of sleeve 17, the plug 24 limiting the inward movement.

The visor 25 is hingedly secured to the frame 10 as at 26. On visor 25, in alignment with screw 23, a connector 27 is mounted which includes the downwardly extending U-shaped portion 28. On the end of screw 23 a connector 29 is mounted which includes a downwardly extending portion 30. A link 31 is pivotally connected to portion 28 at 32 and said link is pivotally connected to portion 30 at 33. Thus when screw 23 is moved, as described, the movement is transmitted to visor 25 through link 31.

While I have illustrated and described the preferred form of construction for carrying my invention into effect, this is capable of variation and modification, without departing from the spirit of the invention. I therefore, do not wish to be limited to the precise details of contruction set forth, but desire to avail myself of such variation and modifications as come within the scope of the appended claim.

Having thus described my invention, what I claim as new and desire to protect by Letters Patent is:

A device for adjusting the angular position of the sun visor of an automotive vehicle, comprising, in combination with a windshield having an opening therein and a sun visor hinged at its upper end to the top of the vehicle, a re-enforcing plate on said windshield having an opening therein aligned with the opening in said windshield, a supporting plate on the opposite side of said windshield having a collar extending therefrom having the interior opening thereof aligned with the opening in said windshield, a sleeve extended through said aligned openings, a headed end on said sleeve disposed in abutment with said reenforcing plate, said sleeve having a screw threaded portion on the periphery thereof on the end opposite said headed end, a handle member mounted on said screw threads and disposed in abutment with the outer end of said collar whereby to hold said sleeve in said openings against lateral movement, said sleeve having the inner periphery thereof screw threaded, a screw member threadedly mounted in said screw threaded sleeve and movable axially with respect to said sleeve when said handle is moved to rotate said sleeve, a block connected to the outer end of said screw member and connected thereto in such a manner that said screw member may be rotated relative to said block, a link connected to said block and pivotally connected to a bracket on said visor whereby when said screw is moved by rotation of said handle member said link will transmit the movement thereof to said visor to move said visor into various angular positions with respect to the windshield.

In testimony whereof he affixes his signature.

PETER J. WARAKSA.